(No Model.)　　　　　W. P. COWAN.　　　　4 Sheets—Sheet 3.
APPARATUS FOR TREATING PARAFFIN WAX, &c.
No. 558,358.　　　　　　　Patented Apr. 14, 1896.
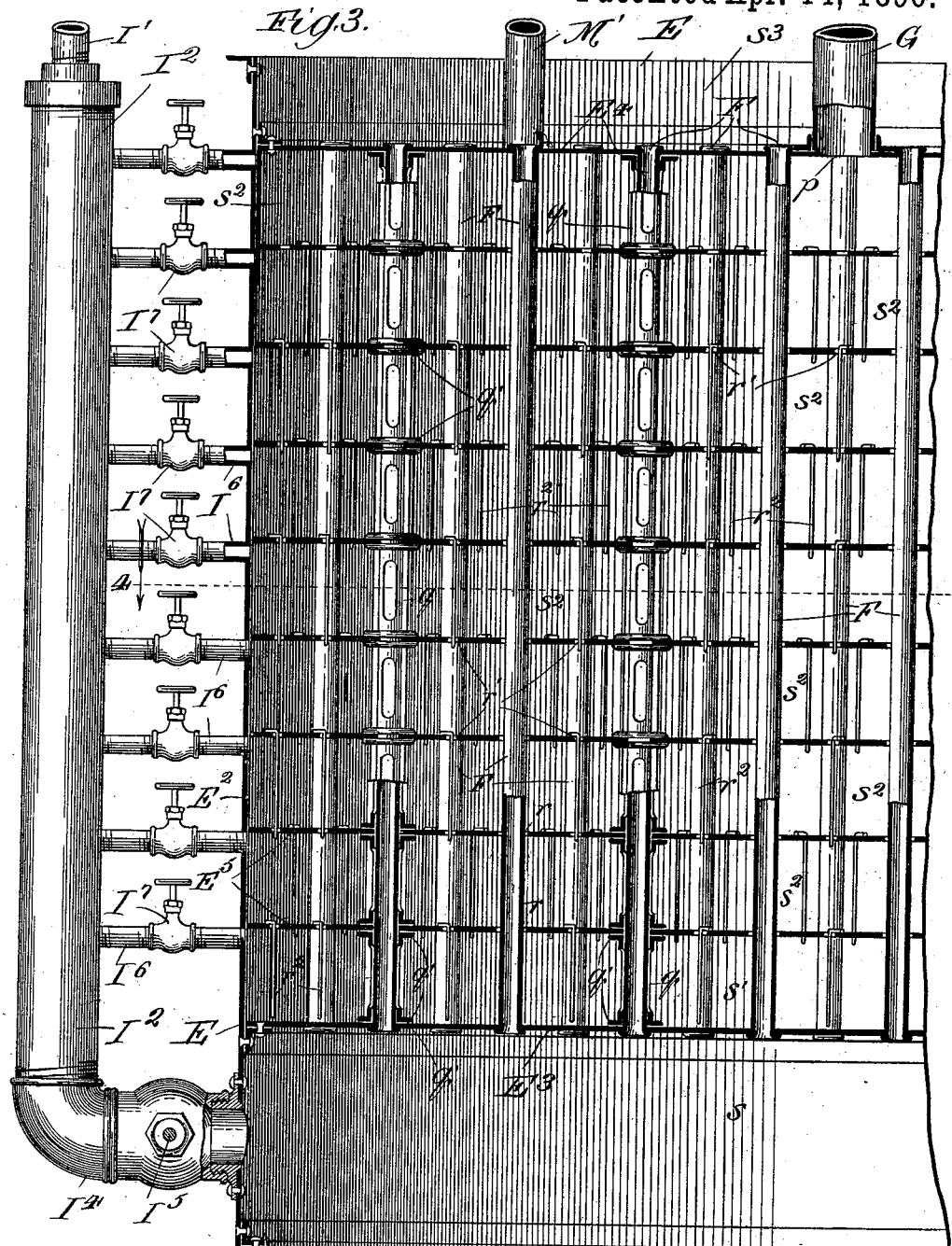

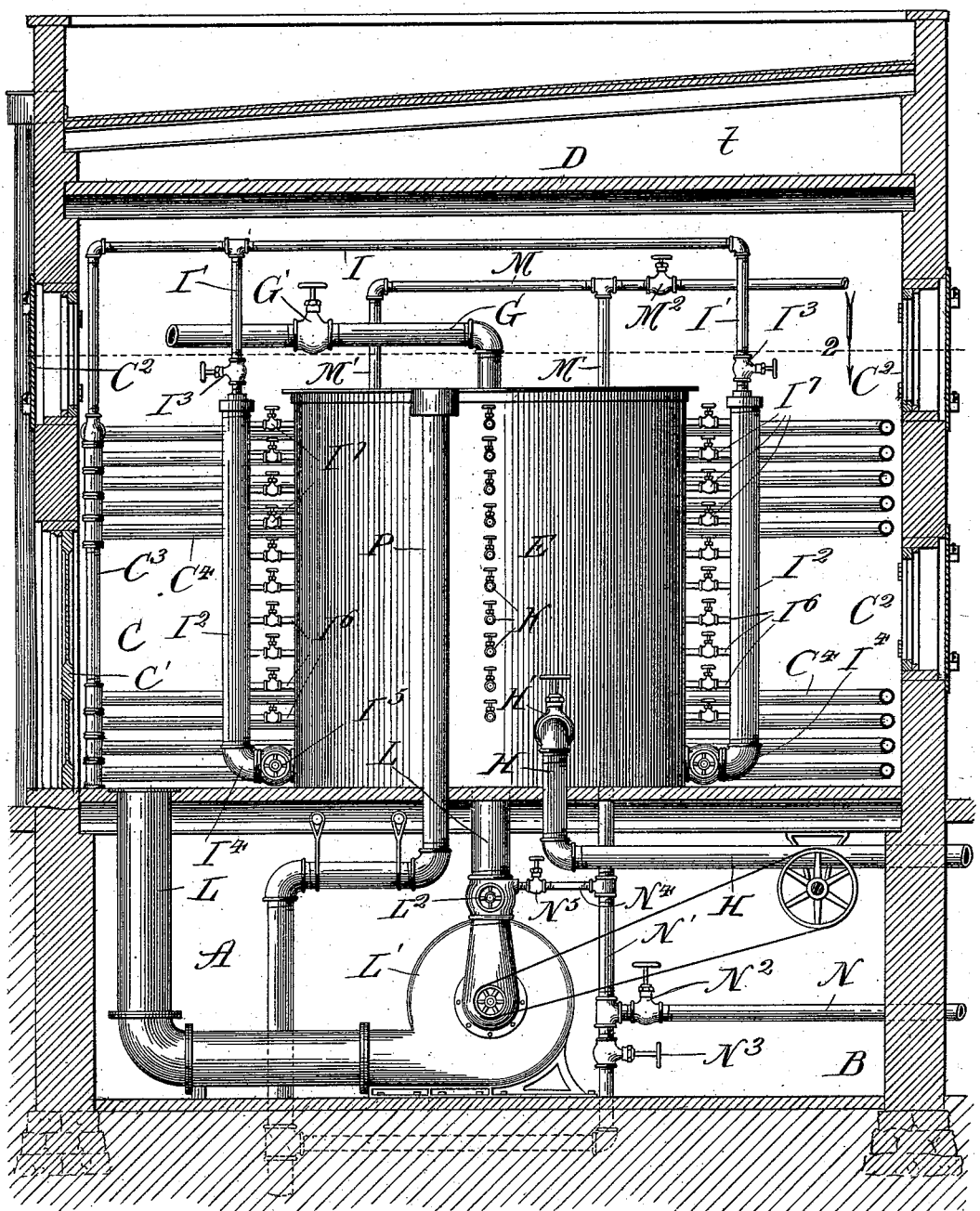

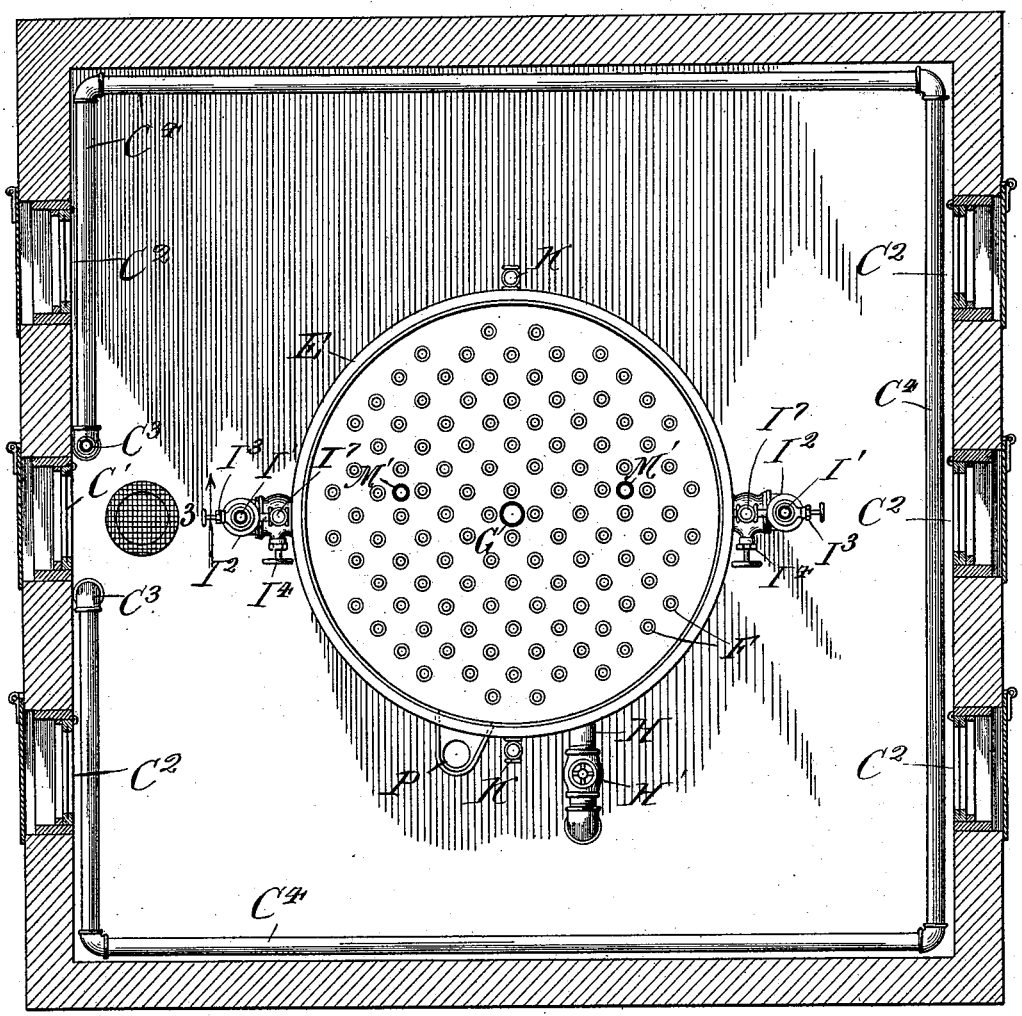

(No Model.) 4 Sheets—Sheet 4.
W. P. COWAN.
APPARATUS FOR TREATING PARAFFIN WAX, &c.
No. 558,358. Patented Apr. 14, 1896.
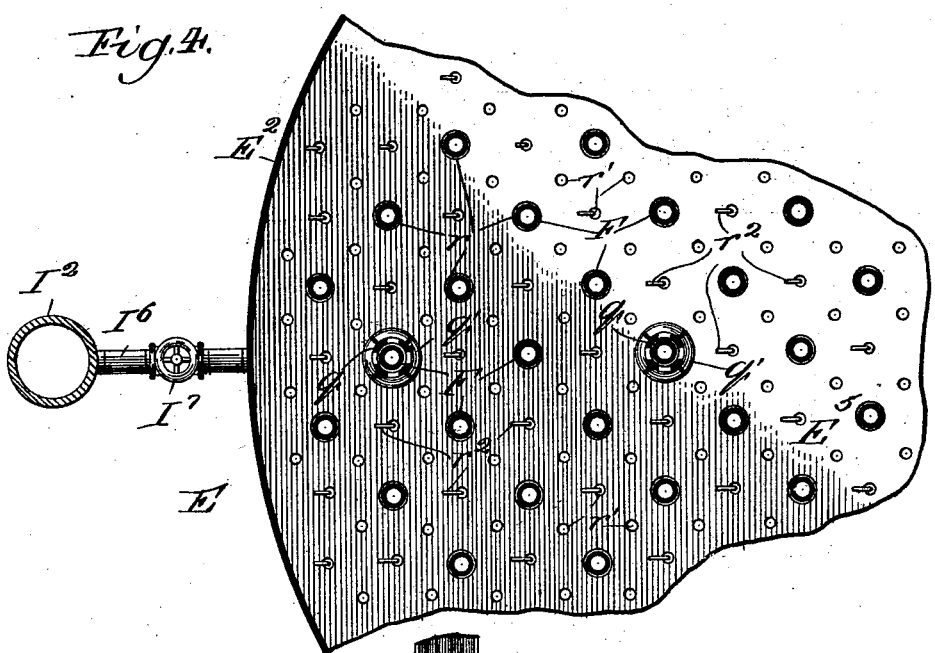
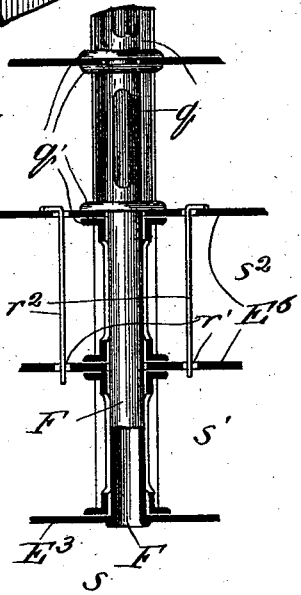

UNITED STATES PATENT OFFICE.

WILLIAM P. COWAN, OF CHICAGO, ILLINOIS.

APPARATUS FOR TREATING PARAFFIN-WAX, &c.

SPECIFICATION forming part of Letters Patent No. 558,358, dated April 14, 1896.

Application filed November 29, 1895. Serial No. 570,450. (No model.)

*To all whom it may concern:*

Be it known that I, WILLIAM P. COWAN, a citizen of the United States, residing at Chicago, in the county of Cook and State of Illinois, have invented a new and useful Improvement in Methods of and Apparatus for Treating Paraffin-Wax and Similar Material, of which the following is a specification.

My invention relates to an improved method of treating a mass of material melting at a low temperature, which mass contains or is composed of parts, lesser masses of material, or ingredients the comparative melting-points of which differ, the purpose of the treatment being to separate and collect the respective and separately-obtained parts, masses, or ingredients, and while my improved method may be employed in treating various materials to purify them or effect separation of certain or all the different parts which they contain my purpose is more especially to improve upon the methods hitherto employed in purifying and treating paraffin-wax to prepare it for the market.

The different purposes for which purified paraffin-wax is employed in commerce require wax of different "melting-points," the term signifying the degree of temperature necessary for its fusion, and it is usual to grade or classify purified paraffin-wax on the market according to its melting-point.

In the treatment of paraffin-wax to separate it into the different grades desired the crude wax, containing a small percentage of petroleum-oil, is subjected to a sweating process, which consists in raising the temperature of the mass to the degree required to separate and run off the petroleum-oil and then raising the temperature gradually to first run off the more readily fusible portions of the wax and then by stages those of progressively higher melting-points, whereby the grades are separated and may be run into different receptacles.

The methods hitherto followed in effecting the sweating operations have been more or less unsatisfactory for the reasons that in their employment the carrying on of the operations was necessarily slow and the treatment or separation from each other of the portions possessing the different melting property could not be effected with the degree of accuracy which is desirable.

The objections to the methods hitherto employed in the treatment of paraffin-wax are mainly due to the fact, first, that they provide no artificial means for initially cooling the wax to congeal it, so that the cooling is always slow, and in warm weather the wax, even when run into comparatively shallow pans, does not solidify for days, and, second, the sweating heat is applied only above and below the pans, so that the interior of each body of wax, owing to the fact that wax is a bad conductor of heat, is not as readily affected by the changes of temperature as is desirable in the sweating operations to produce the best results.

My object is to provide a novel and improved method for employment more especially in purifying and treating paraffin-wax in large quantities, and which shall, first, effect thorough purification of the crude wax; second, render it easy to grade or classify the purified wax with greater accuracy than has hitherto been possible, and, third, cause the whole operation of cooling, sweating, and running off the mass to be performed with greater economy in time and labor than is possible in the practice of any other method of which I am aware. My object is also to provide improved apparatus for carrying out my method.

In the practice of my invention I provide a vessel of large dimensions capable of receiving several tons of crude wax and containing a number of horizontally-disposed perforated metal diaphragms which divide the interior of the vessel into a series of horizontal intercommunicating chambers, all preferably of the same size. The vessel is located in a room provided with means for quickly heating and cooling it. Extending vertically through the vessel is a series of pipes, and the diaphragms are provided with a large number of conductor wires or pins. Extending to the upper part of each horizontal chamber is a steam-induction pipe, and the said vertical pipes may be caused at will to conduct either a cooling or a heating fluid through the chambers and the bodies of wax they contain. The bodies of wax filling the chambers are rendered subject at very short intervals throughout to the influence of the change in temperature of the metal conductors, whereby the entire mass will be treated equally and, as nearly as possible, simultaneously.

In the drawings, which show the apparatus I prefer to employ, Figure 1 is a vertical section of a building containing my improved apparatus, the latter being shown in side elevation; Fig. 2, a plan section taken on line 2 of Fig. 1; Fig. 3, an enlarged broken vertical section taken on line 3 of Fig. 2 and viewed in the direction of the arrow; Fig. 4, a still further enlarged broken-plan section taken on line 4 of Fig. 3, and Fig. 5 an enlarged broken and vertical section of details of the construction.

As illustrated, the apparatus is located in a building A of special construction, having a lower chamber B, upper chamber or inclosure C, and double roof D, formed with the air-space $t$.

At C' is a door affording entrance to the room C, and at opposite sides of the room are two tiers of windows $C^2$, which may be opened and closed, as desired, in regulating the temperature of the room. Extending around the room is a coil formed with manifolds $C^3$ on opposite sides of the door C' and pipes $C^4$. The coil may be connected at will to a steam-supplier, and, if desired, a connection may be provided between the coil and a cooling-fluid supplier, whereby either a heating or a cooling fluid may be caused to circulate through the coil, and the room thus heated or chilled, as required.

E is a metal vessel or tank formed with a plate or false bottom E', Fig. 3, and a preferably cylindrical wall $E^2$. Above the bottom E', and secured at its circumference to the cylinder-wall, is a horizontal diaphragm or base-plate $E^3$ for the vessel, and near the top of the tank and similarly secured in place is a diaphragm or top plate $E^4$. The upper and lower plates $E^3$ and $E^4$ render the interior of the vessel close. Between the plates $E^3$ $E^4$ is a series of horizontal diaphragms $E^5$.

Below the plate $E^3$ is a chamber $s$, and the diaphragms $E^5$ divide the interior of the tank between the plates $E^3$ $E^4$ into a series of horizontal spaces or chambers $s'$ $s^2$. The chamber $s'$ is the lowermost, and the chambers $s^2$ are preferably all of the same dimensions as the chamber $s'$. Above the uppermost chamber $s^2$ is a basin $s^3$, formed by the top plate $E^4$ and annular wall of the tank. Extending vertically through the vessel is a series of pipes or flues F. The pipes F are fastened at their lower ends in the plate $E^3$ and at their upper ends in the plate $E^4$ and pass through openings in the diaphragms $E^5$, somewhat larger in circumference than the pipes, whereby annular spaces $r$ are left about the pipes through all the diaphragms $E^5$. The pipes F afford free communication between the chamber $s$ and basin $s^3$, but do not communicate with the chambers $s'$ $s^2$. Around certain of the pipes F, at intervals across the tank, are spacing-thimbles $q$, having flanged upper and lower ends $q'$. The thimbles are of the exact height of the chambers $s'$ $s^2$, and afford supporting-columns to prevent sagging of the diaphragms. Each of the diaphragms $E^5$ is provided with numerous small openings or perforations $r'$, Fig. 5, and extending, preferably, through all the openings $r'$ are wires or pins $r^2$. In practice the perforations $r'$ and pins $r^2$ may be much more numerous than as illustrated in the drawings, and the pins $r^2$ comprise each a strip of metal wire bent to a right angle at the head portion and of a diameter somewhat less than the perforations $r'$. They are preferably of a length slightly exceeding the height of the chambers and are passed through the perforations of one diaphragm, to hang therefrom at the head portion and extend at their opposite ends preferably through the perforations in the diaphragms next below, all as illustrated in Fig. 3. Those pins which are passed through the lowermost diaphragm $E^5$ may extend short of the plate $E^3$, as illustrated.

G is a pipe extending from a suitable vat or caldron where crude paraffin-wax is melted and opening at $p$ into the top of the uppermost chamber $s^2$, as shown in Fig. 3. The pipe G is provided with a valve G'. Extending from the lower side of the chamber $s'$ is a draw-off pipe H, provided with a valve H'.

I, Fig. 1, is a steam-supply pipe having branches I' I' leading to vertical pipes or manifolds $I^2$ $I^2$ on opposite sides of the tank. The pipes I' are provided with valves $I^3$, and at their lower ends the manifolds communicate through coupling-pipes $I^4$ with opposites sides of the chamber $s$. The coupling-pipes are provided with valves $I^5$. Extending between the manifolds $I^2$ and upper parts of the chambers $s'$ $s^2$, at opposite sides of the latter, are pipes $I^6$, provided with valves $I^7$. Extending through the wall of the tank, at opposite sides of the latter, are series of openings provided with valves or cocks K at the upper sides of the chambers $s'$ $s^2$ in the planes of the pipes $I^6$. Communicating at one end with the chamber $s$ is an air-flue L, which passes down into the chamber B and thence up through the floor of the chamber C, opening into the latter at one side of the tank.

Interposed in the flue L is a fan-blower L', and also interposed in the flue, between the blower and chamber $s$, is a valve $L^2$. M is a water-supply pipe having branches M', which extend through the top plate $E^4$ to the uppermost chamber $s^2$. Interposed in the pipe M is a valve $M^2$. In the room B is a water-supply pipe N, communicating with a pipe N', which extends through the bottom E' of the tank into the chamber $s$. The pipe N', below the pipe N, may extend to a sewer or drain. (Not shown.) At the pipe N' the pipe N is provided with a valve $N^2$, and below the pipe N the pipe N' is provided with a valve N³. Extending between the pipes N' L at the valve L² is a branch pipe N⁴, provided with a valve N⁵. Extending down the side of the tank and communicating at its upper end with the basin s³ is an overflow-pipe P, which may lead to a sewer or drain.

If desired, the pipes N' P may lead to a storage tank or reservoir, so that the water passing through them may be pumped into the pipes N M, and thus used over and over again.

Presuming that the tank is empty and all the valves closed, the operations will be as follows: First, the valve M² on the water-supply pipe M is opened to cause water to flow into the topmost chamber s², and thence through the perforated diaphragms to the chamber s'. When the chamber s' is filled, as may be detected by opening one of the lowermost cocks K, the valve M² is closed. Next the valve G' is opened to cause melted crude wax to flow from its melting-vat (not shown) into the uppermost chamber s², and thence downward through the openings r and perforations r' to the lowermost chamber s². The water in the chamber s' will prevent the wax from entering that chamber. The wax is caused to flow into the tank until all the chambers are filled to the top plate E⁴.

The next operation necessary is to cool and solidify the wax in all the chambers s², and thus prepare it for the sweating operation. If the weather is cold, the windows C² should be opened to cool the room C, or if the weather is warm the windows may remain closed, and, if desired, a cooling fluid may be caused to circulate through the coil, consisting of the manifolds C³ and pipes C⁴. Next the valve N² is opened to cause water from a cold-water supply to flow into the chamber s, fill the latter, and rise through the pipes F, Fig. 3, to the basin s³, whence it will overflow through the pipe P. If the weather is very cold, or the room is chilled by artificial means, instead of opening the valve N² to cause water to flow through the pipes or flues F the fan L' may be started to circulate cold air through the room C, chamber s, and pipes F. The effect of the cold water or cold air will be to chill the pipes F and diaphragms, and, by conduction, chill the pins r², whereby the mass of wax throughout the chambers will be rapidly cooled and solidified.

To carry on the sweating operation, the valve N² is closed and the valve N³ opened, whereby all the water in the chamber s and pipes F, if water has been employed for cooling the wax, will be drained off. The valve H' is also opened to drain the water from the chamber s'. The valve N⁵ should also be opened to drain the water from the pipe L above the valve L², after which the valve N⁵ is again closed. The windows C² are then tightly closed and steam is let into the coil C³ C⁴ to warm the room C. Following this the fan L' is started to draw warm air from the upper part of the room downward through the pipes or flues F and chamber s and discharge the air again into the room. The heat of the air passing through the pipes F will warm the diaphragms and, through conduction, warm the pins r², whereby in a comparatively short time the whole mass of wax in the chambers will be subjected to the first sweating heat. The temperature of the room is properly regulated, so that the wax will be subjected for some time to a comparatively even temperature sufficiently high to cause the petroleum-oil which is mixed with the wax to exude and drain therefrom by flowing through the openings r along the pipes F and through the perforations r' and down the pins r² to the chamber s', whence it flows through the pipe H to a suitable receptacle provided to receive it. The petroleum-oil will in practice carry with it more or less wax, and it may be returned to the melting-vat, before mentioned, and at some future time again passed through the same or another sweating-tank. After the wax has been purified by running off the petroleum-oil, as described, the temperature of the room is raised to fuse that portion of the wax having the lowest melting-point. Each time the temperature is raised in the room the heat of the pipes F, diaphragms, and pins r² will be raised, and so exert a greater heat throughout the wax. The running off of the petroleum-oil will cause the body of wax in each chamber to contract somewhat, and thus leave an open space between the wax and the diaphragm next above it. After this has taken place the cocks K may be opened to cause the heated air in the room to circulate over each separate body of wax and supplement the action of the pipes, diaphragms, and pins in heating the wax. Thus the wax of different melting-points will run off successively through the draw-off pipe H, and may be turned into different receptacles. The operation described is continued until as much of the wax has been withdrawn from the chambers s² as is practicable or desirable under the heat from the room. In practice one-fourth or more of the wax in each chamber may be thus withdrawn.

To run off the wax still remaining in the chambers and having higher melting-points, the valves I⁷ are next opened to cause steam from the manifolds I² to flow into the chambers s' s². The fan L' may be stopped and the valves I⁵ opened to cause the chamber s to be filled with steam. By regulating the degree of opening of the valves I⁷ the inflow of steam to the chambers may be regulated and the heat increased by stages to run off, successively, the wax of increasing melting-points. This operation is continued until all the wax has been run off and the vat emptied.

The operation described may be variously modified to suit the requirements and to produce the separations desired. By careful manipulation separations may be effected which will cause the different runs to vary but slightly with respect to their melting-points, or if it is desired, for example, to obtain a comparatively large quantity of wax of a certain melting-point all the wax of, say, from 5° below to 5° above such melting-point may be caused to run off at once to produce the desired average.

While I prefer to practice my improved method and construct the apparatus throughout as shown and described, they may be variously modified in the matter of details without departing from the spirit of my invention as defined by the claims.

What I claim as new, and desire to secure by Letters Patent, is—

1. The method of treating a mass of material of the nature described, to subject it progressively to different temperatures for the purpose set forth, which consists in pouring the mass in a melted condition into a receptacle provided with numerous fluid-current-conveying tubes, which are thereby embedded in the mass, passing through the tubes a cooling fluid and thus producing an approximate solidification of the mass, then passing through the tubes heating-fluid currents of progressively higher temperature, and withdrawing from the mass and collecting the material as it melts, substantially as set forth.

2. The method of treating a mass of material of the nature described to subject it progressively to different temperatures for the purpose set forth, which consists in pouring the mass in a melted condition into a receptacle, there subjecting it to a cooling temperature to produce an approximate solidification and then causing to pass and be disseminated by means of metallic conductors throughout all parts of the mass fluid currents of progressively higher temperature, and collecting and removing the material melted at the successive temperatures, substantially as described.

3. The method of treating a mass of material of the nature described, to subject it progressively to varying temperatures for the purpose set forth, which consists in passing through the mass by means of numerous metallic conductors a heating agent, causing said agent to have a progressively higher temperature, whereby the mass is acted upon by progressively-rising temperatures disseminated throughout the mass by the metallic conductors, collecting the melted material as it is produced and leading it from the mass through the medium of said metallic conductors, and collecting the melted material, substantially as and for the purpose described.

4. The method of treating material of the nature described, for the purpose set forth, which consists in dividing the mass into layers, subjecting it to a cooling temperature until it has reached the desired solidified condition, thereupon subjecting each layer to the action of a heating fluid disseminated throughout the same, through the medium of metallic conductors progressively raising the temperature of said fluid, and permitting it to act at varying temperatures for a suitable period upon the mass, collecting the melted material obtained in each period and finally subjecting the mass in respective layers to separate steam-currents and collecting the product thus melted, all as set forth.

5. The method of treating material of the nature described, for the purpose set forth, which consists in dividing the mass of material into separate layers arranged one above the other, with vertical passages through them, passing a cooling fluid through said passages to produce approximate solidification of the layers, thereupon passing through said passages a heated fluid, such as hot air, progressively raising the temperature of said heated fluid and disseminating the heat throughout the mass, thereby causing the extraction from the mass progressively of quantities of the mass having different melting-points, collecting the separate quantities, substantially in the manner set forth, and completing the extraction by subjecting each layer of material to the action of steam, all as set forth.

6. The method of separating a mass of paraffin-wax, or the like material, into masses having different melting-points, which consists in inclosing the wax in a vessel having vertical heat-flues, introducing into the mass metallic conductors, passing heat through the flues and disseminating the heat throughout the mass by way of the metallic conductors, progressively raising the heat in the flues and collecting the material melted by the heat as it exudes from the mass and as it is conducted therefrom by way of the metallic conductors, substantially as described.

7. The method of separating material, such as paraffin-wax, into quantities having different melting-points, which consists in retaining the mass of material in a vessel having horizontal diaphragms and vertical heat-flues, whereby the mass is held in layers and through each layer extends a heat-flue, passing heat through said flues and disseminating it throughout the mass, progressively raising the temperature in the flues, whereby a quantity of the material having progressively different melting-points is acted upon, collecting the melted product so progressively obtained, and completing the melting by subjecting the mass to the action of steam having its temperature progressively raised and collecting the product, substantially as described.

8. In an apparatus for treating a mass of material, of the nature described, to first solidify and then abstract therefrom under heat portions possessing different melting-points, a vessel divided internally into a vertical series of intercommunicating chambers, means for charging the said vessel with the material in the melted state, a series of closely adjacent flues extending vertically through said chambers, a cooling-fluid supplier, means for directing the said cooling fluid through the said flues to solidify the melted material, a heating-fluid supplier, means for directing the said heating fluid through the said flues and for disseminating the heat throughout the mass, and heat-regulating means at said heating-fluid supplier, whereby the heat of the heating fluid, passing through the flues, may be changed as desired, substantially as and for the purpose set forth.

9. In an apparatus for treating a mass of material, of the nature described, to abstract therefrom portions possessing different melting-points, a vessel divided internally into a vertical series of intercommunicating chambers, means for charging the said vessel with material in the molten state to fill the said chambers, a series of flues extending vertically through said chambers, means for directing either a cooling fluid or a heating fluid through said flues, and a steam-induction pipe communicating with the chambers, substantially as and for the purpose set forth.

10. In an apparatus for treating a mass of material, of the nature described, to first solidify the mass and then abstract therefrom under heat portions possessing different melting-points, a vessel, comprising a circumferential wall and upper and lower plates rendering the interior of the vessel close, a series of perforated diaphragms between the said upper and lower plates, dividing the chamber into a vertical series of intercommunicating chambers, vertical flues, fastened at opposite ends in the said upper and lower plates and passing through openings in the said diaphragms, an inlet, for the material in a molten condition at the top of the vessel, an outlet, for the material in a molten condition, at the lowermost said chamber, cooling-fluid and heating-fluid suppliers, means for passing fluid from either said supplier through the said flues, and steam-induction pipes at the said chambers, substantially as and for the purpose set forth.

11. In an apparatus for treating a mass of material, of the nature described, to first solidify the mass and then abstract therefrom under heat portions possessing different melting-points, a vessel, comprising a circumferential wall and upper and lower plates, rendering the interior of the vessel close, a series of perforated diaphragms between the said upper and lower plates, dividing the chamber into a vertical series of intercommunicating chambers, conductor-pins suspended from the said diaphragms in the said chambers, vertical flues fastened at opposite ends in the said upper and lower plates, and passing through openings in the said diaphragms, an inlet for the material, in a molten condition, at the top of the vessel, an outlet for the material, in a molten condition, at the lowermost said chamber, cooling-fluid and heating-fluid suppliers, means for passing fluid from either said supplier through the said flues, and steam-induction pipes at the said chambers, substantially as and for the purpose set forth.

12. In an apparatus for treating a mass of material, of the nature described, to first solidify the material and then abstract therefrom under heat portions possessing different melting-points, a vessel comprising a circumferential wall, and upper and lower plates, rendering the interior of the vessel close, a chamber below the said lower plate, a series of perforated diaphragms in the vessel dividing the space between the said upper and lower plates into a vertical series of intercommunicating chambers, a series of vertical flues fastened at their ends in the said upper and lower plates and extending through openings in the said diaphragms, a water-supplier, means for directing water from the said supplier through the said flues and through the chamber below said lower plate, a heating-fluid supplier, a connection between the said heating-fluid supplier and the chamber below the said lower plate, and steam-induction pipes communicating with the interior of the vessel between the said upper and lower plates, substantially as and for the purpose set forth.

13. In an apparatus for treating a mass of material, of the nature described, to first solidify the material, and then abstract therefrom under heat portions possessing different melting-points, a vessel divided internally into a vertical series of intercommunicating chambers, an inlet for the material, in a molten state, at the upper part of said vessel, an outlet for the material, in a molten state, at the lower said chamber, water-supplying means for the lower said chamber, and a series of vertically-disposed flues extending through all said chambers, cooling-fluid and heating-fluid suppliers, and means for passing fluid from either said suppliers through the said flues, substantially as and for the purpose set forth.

14. In an apparatus for treating a mass of material, of the nature described, to first solidify the material and then abstract therefrom under heat portions possessing different melting-points, a vessel having a lower plate $E^3$, a top plate $E^4$, a chamber $s$ below the lower plate, and a basin above the top plate, perforated diaphragms between the said top and base plates, dividing the space between the said plates into a vertical series of intercommunicating chambers, flues fastened at opposite ends in the said plates and passing through openings in the said diaphragms, and affording direct communication between the chamber $s$ and basin, an inlet for the material, in a molten state, at the top of the vessel, an outlet for the material, in a molten state, at the lower part of the vessel above the said lower plate, water-supplying means for the said vessel, cooling and heating fluid suppliers, means for connecting either said supplier with the chamber $s$, whereby either cooling or heating fluid may be passed through the said flues, steam-induction pipes at each said chamber, and an overflow-outlet at the said basin, substantially as and for the purpose set forth.

15. In an apparatus for treating a mass of material, of the nature described, to abstract therefrom portions possessing different melting-points, a room or compartment provided with means for heating it, a vessel in the room divided internally into a vertical series of intercommunicating chambers, inlet and outlet pipes for the material at the said vessel, a series of flues extending vertically through said chambers, means for passing a heating fluid through said flues, and openings in the vessel toward the top of each said chamber, the said openings being provided with valves, substantially as and for the purpose set forth.

WILLIAM P. COWAN.

In presence of—
J. H. LEE,
RICHARD SPENCER.